(12) United States Patent
Yamada

(10) Patent No.: US 6,339,654 B1
(45) Date of Patent: *Jan. 15, 2002

(54) APPARATUS AND METHOD FOR EFFICIENTLY PROCESSING COLOR AND MONOCHROME IMAGES

(75) Inventor: Koji Yamada, Yokohama (JP)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/535,665

(22) Filed: Sep. 28, 1995

(30) Foreign Application Priority Data

Sep. 29, 1994 (JP) ............................................. 6-235076
Mar. 1, 1995 (JP) ............................................. 7-041463

(51) Int. Cl.[7] ................................................ G06K 9/00
(52) U.S. Cl. ...................................... 382/162; 358/530
(58) Field of Search ................................ 358/501, 530, 358/540, 450, 538; 382/162, 173

(56) References Cited

U.S. PATENT DOCUMENTS

| 4,739,397 A | | 4/1988 | Hayashi | 358/501 |
| 4,800,510 A | * | 1/1989 | Vinberg et al. | 364/521 |
| 4,953,012 A | | 8/1990 | Abe | 358/540 |
| 5,317,420 A | * | 5/1994 | Kuwahara | 358/530 |
| 5,357,354 A | * | 10/1994 | Matsunawa et al. | 358/530 |
| 5,436,735 A | * | 7/1995 | Tanabe et al. | 358/453 |
| 5,568,248 A | * | 10/1996 | Wagley | 355/201 |
| 5,577,173 A | * | 11/1996 | Dennis et al. | 395/116 |

* cited by examiner

Primary Examiner—Yon J. Couso
(74) Attorney, Agent, or Firm—Fitzpatrick, Cella, Harper & Scinto

(57) ABSTRACT

An image processing apparatus comprises an input unit for inputting image data constituting an image to be output, a determination unit for determining whether the image to be output is a monochrome image, a color image having a number of colors larger than a predetermined value or a color image having a number of colors smaller than the predetermined value, and an image processing unit for carrying out image processing on the input image data based on the result of the determination.

9 Claims, 17 Drawing Sheets

APPARATUS AND METHOD FOR EFFICIENTLY PROCESSING COLOR AND MONOCHROME IMAGES

BACKGROUND OF THE INVENTION

1. Field of the Invention

This invention relates to an image processing apparatus and method for carrying out image processing according to the characteristics of an image.

2. Related Background Art

Heretofore, a printer driver which is software for controlling a color printer has carried out the processing of color conversion from RGB (red, green and blue) colors to CMYK (cyan, magenta, yellow and black) colors which can be printed by the printer as well as pseudo gradation processing or color compensation processing for all image data to form output image data, no matter whether all the areas of an output image are colored or not, that is, whether or not they include a monochrome area, and has outputted the image data to the printer for color printing, in accordance with a drawing order when it receives the drawing order for an RGB color image from an application program for color printing.

However, in the above printer control, when the output image is partially colored and includes a monochrome area, the printer driver has performed the processing of color conversion into CMYK colors and pseudo gradation or color compensation processing for image data on the monochrome area as well. As the result, when an image includes a large monochrome area, there are such problems as low efficiency and low processing speed.

Similarly, when gray scale printing is performed with a monochrome printer, color conversion processing from RGB colors into gray and pseudo gradation or color compensation processing have been performed for all image data, no matter whether or not an output image is partially gray, that is, whether or not it includes a solid black or white monochrome area and hence, there are the same problems, that is, low efficiency and low processing speed.

SUMMARY OF THE INVENTION

In view of the above problems, it is therefore an object of the invention to carry out image processing efficiently by processing an image depending on whether an image of interest is a monochrome image, a color image having a larger number of colors than a predetermined value, or a color image having a smaller number of colors than the predetermined value.

Another object of the invention is to identify the number of colors at a high speed by analyzing a drawing order to identify the number of colors.

A further object of the invention is to carry out image processing efficiently by determining whether each predetermined area is colored or not for image processing.

Still another object of the invention is to obtain the good results of image processing irrespective of image processing mode.

To attain the above objects, the present invention provides an image processing apparatus comprising:

input means for inputting image data constituting an image to be output;

determination means for determining whether the image to be output is a monochrome image, a color image having a number of colors larger than a predetermined value or a color image having a number of colors smaller than the predetermined value; and image processing means for carrying out image processing on the input image data based on the result of the determination.

The present invention also provides an image processing apparatus comprising:

input means for inputting a drawing order for forming an image to be output;

identification means for identifying a number of colors of the image to be output by analyzing the drawing order; and image processing means for carrying out image processing on the image to be output based on the number of colors.

The present invention further provides an image processing apparatus comprising:

input means for inputting a drawing order for forming an image to be output;

identification means for analyzing the drawing order and identifying whether a predetermined area of the image to be output is colored or not; and developing means for developing the image to be output based on the drawing order, for carrying out image processing on the predetermined area of the developed image based on the identification.

The present invention still further provides an image processing apparatus comprising:

input means for inputting image data indicative of an image;

determination means for determining whether color image data is contained in each predetermined area of the image; and selection means for selecting a color image processing mode or a monochrome image processing mode for each predetermined area based on the result of the determination, wherein there is conformity between the color image processing mode and the monochrome image processing mode in the processing result for a predetermined color.

Other objects, features and advantages of the invention will become more apparent from the following description when taken in conjunction with the accompanying drawings.

DETAILED DESCRIPTION OF THE PREFERRED EMBODIMENT

Figure 1:
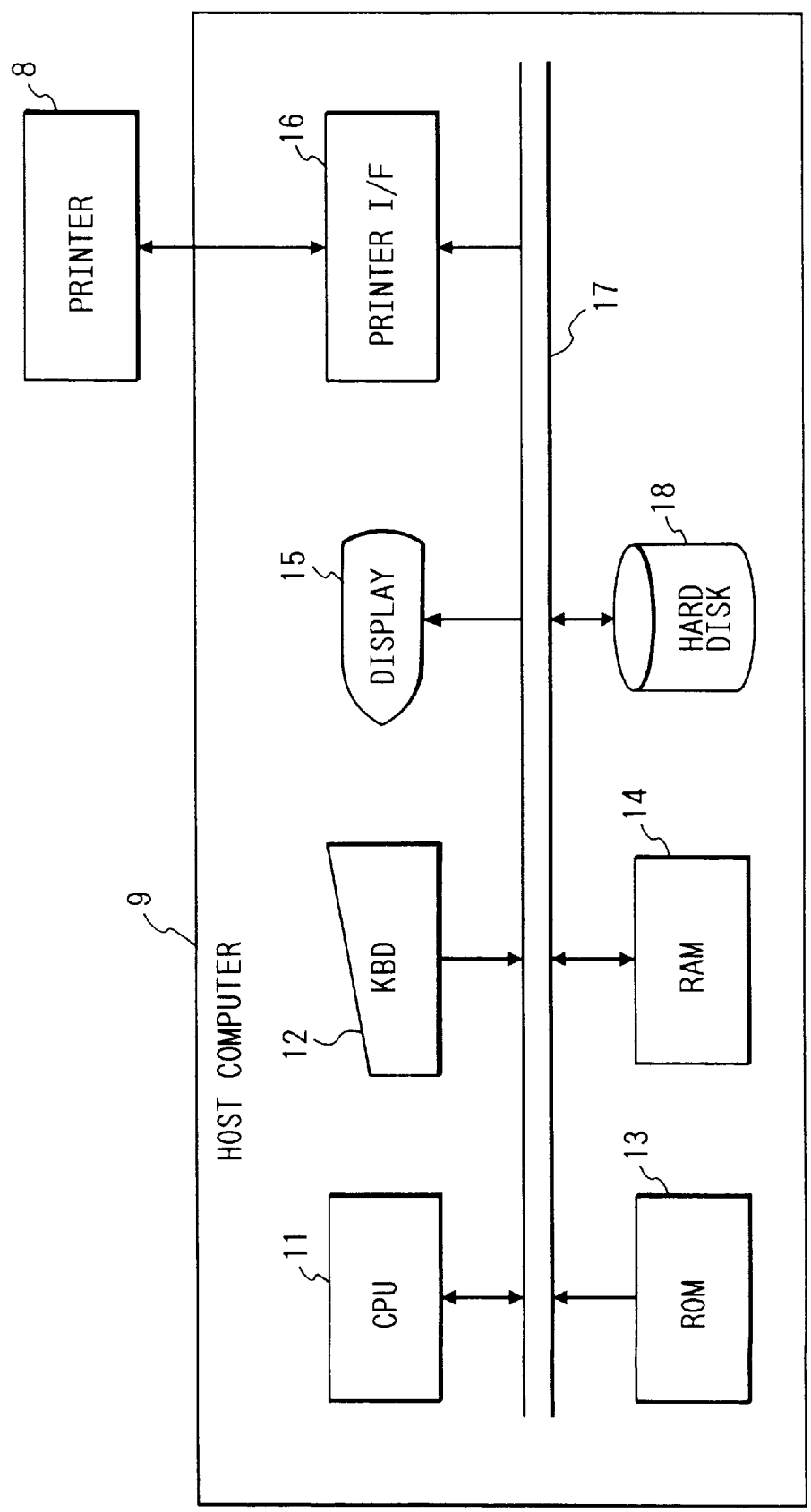
FIG. 1 is a diagram showing an example of hardware configuration.
Figure 2:
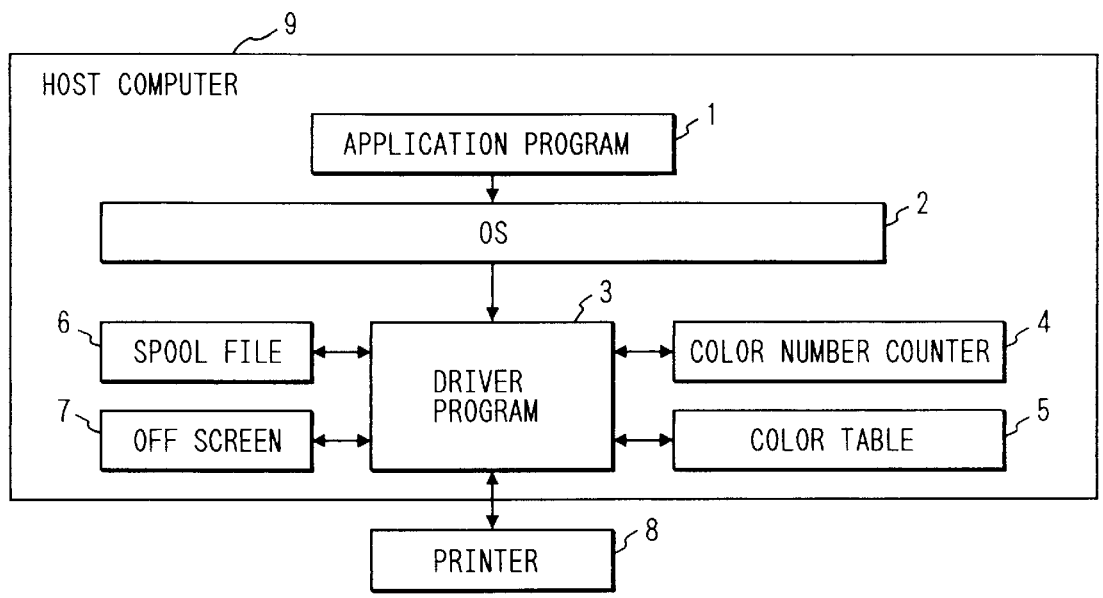
FIG. 2 is a diagram showing the exemplary hierarchy of a printer driver program according to Embodiment 1 of the present invention.

The exemplary hardware configuration of an image processing apparatus according to the present invention is described with reference to FIGS. 1 and 2.

Reference numeral 11 represents a control unit (to be referred to as "CPU" hereinafter) for controlling a host computer 9 according to an Embodiment of the present invention. Reference numeral 12 denotes a keyboard for inputting various data, and 13 a read-only memory (ROM) for prestoring a control procedure for controlling the entire apparatus and other necessary information as well as font patterns used for display and printing. Numeral 14 indicates a random access memory (RAM) used as a work area for storing various data input from the keyboard 12. Denoted at 15 is a display unit for displaying various data input from the keyboard 12 and texts stored in the RAM 4. The display unit 15 is a color display unit which is capable of displaying dot data provided from the CPU 11 and lighting up dot units. Character display dot patterns which form characters on the display unit 15 are stored in the ROM 13 as described above. Numeral 16 represents a printer interface connected to a printer 8, and 17 a data bus used to transfer various data. Numeral 18 represents a hard disk for reading and writing various data. An application program 1, an operating system (OS) 2 and a printer driver program 8 are stored in the hard disk 18 and read out to the RAM for control by the CPU 11.

A detailed description is given of image processing carried out by the above image processing apparatus hereinunder in each Embodiment of the present invention.

(Embodiment 1)

This Embodiment is described in detail with reference to the accompanying drawings.

A description is first given of the outline of printer driver's processing. FIG. 2 is a diagram showing the hierarchy of the application program 1, OS 2, printer driver 3 and printer 8. The printer driver 3 is subordinate to the OS 2 of the host computer 9 and receives a drawing order from the application program 1 of a wordprocessor or the like, converts it into a printing instruction comprehensible to the printer 8 and transfers it to the printer 8. Since a raster printer does not have a complex drawing order, it temporarily stores the instruction from the application program 1 in a file, creates a bit map image on an off screen 7 using the instruction at the time of transfer, and transfers the image to the printer 8. At the time of creating the bit map image, the image is divided to carry out transfer processing when the memory capacity of the host computer 9 is small. The processing of storing the drawing order in a file is called "spool processing" and the file storing the instruction is called "spool file 6". Also, the processing of dividing an image to carry out transfer processing is called "band processing" and the divided image is called "band".

A color number counter 4 counts the number of colors in an image and a color table 5 is a table for storing input color image data corresponding to indices.

The spool file 6 is constructed on the hard disk 18, whereas the off screen 7, the color number counter 4 and the color table 5 are constructed on the RAM. The printer 8 is a color ink jet printer.

Figure 3:
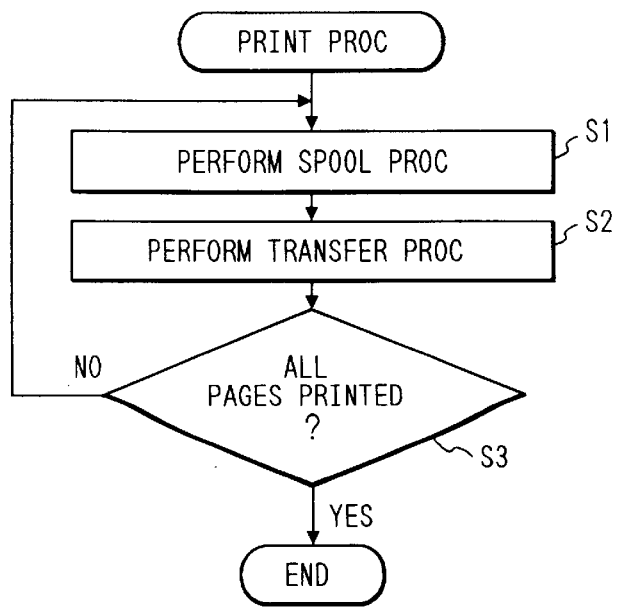
FIG. 3 is a diagram showing an exemplary printing processing flow according to Embodiment 1 of the present invention.
Figure 4:
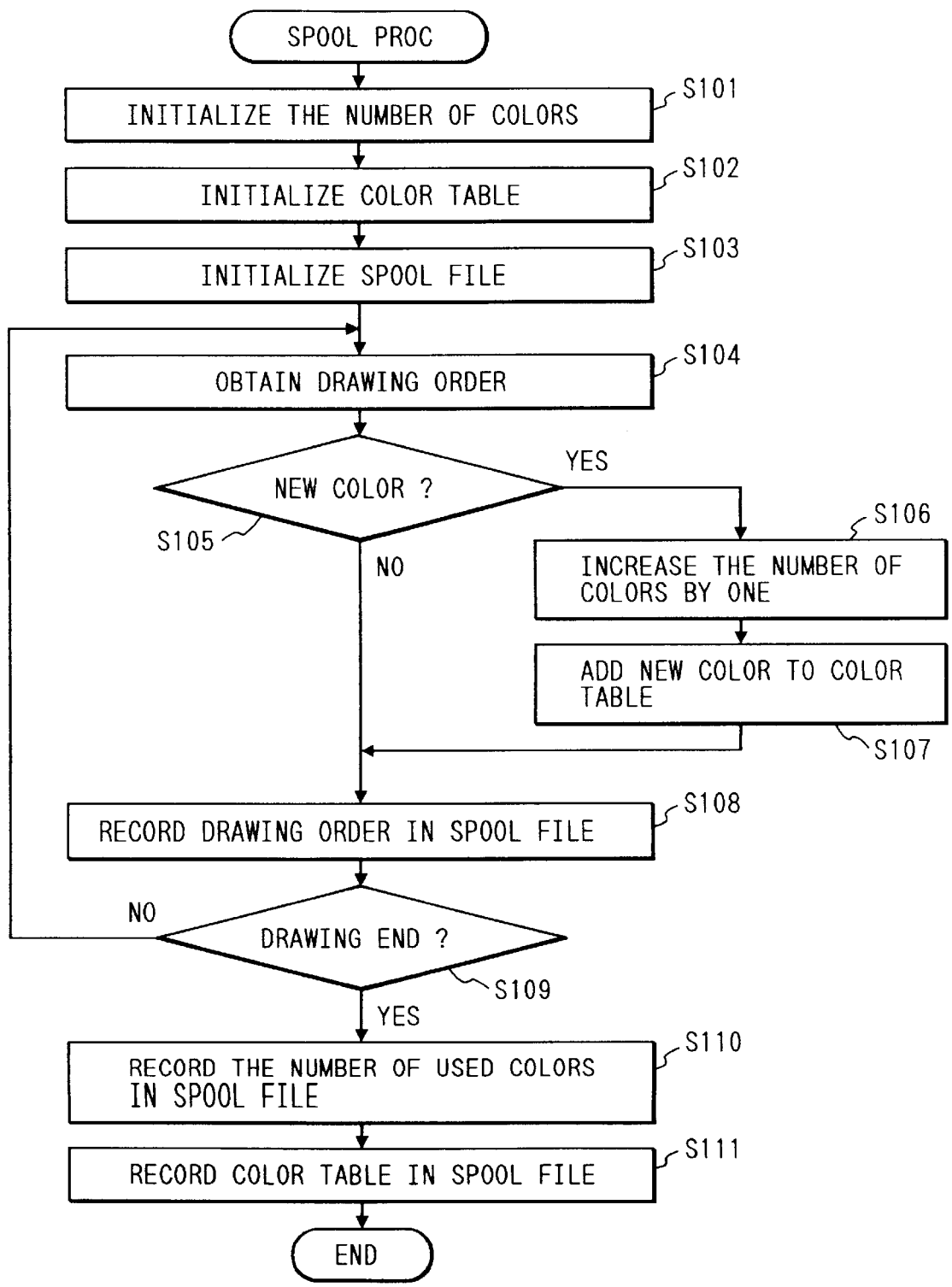
FIG. 4 is a diagram showing an exemplary spool processing flow according to Embodiment 1 of the present invention.
Figure 5:
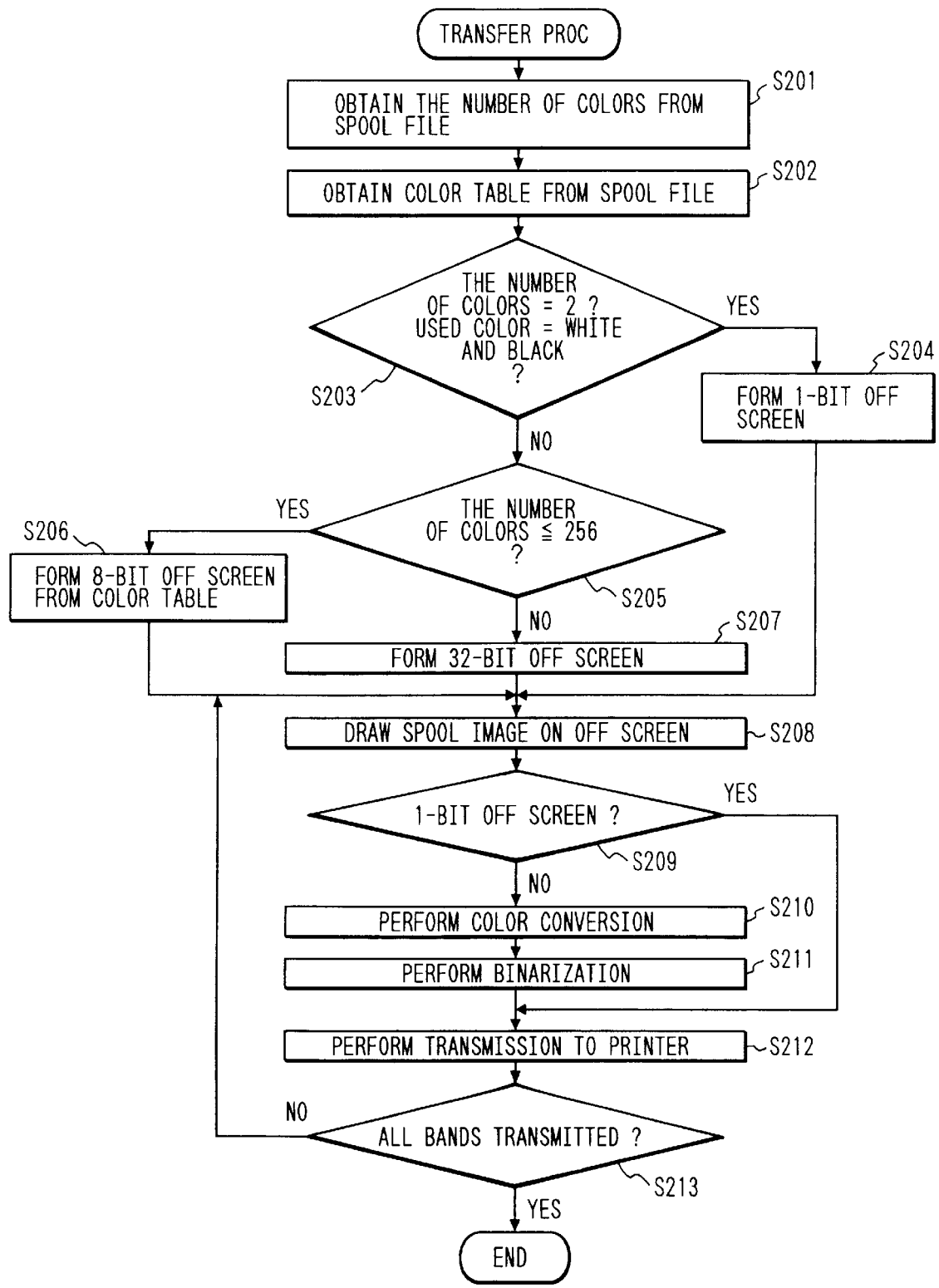
FIG. 5 is a diagram showing an exemplary transfer processing flow according to Embodiment 1 of the present invention.

FIG. 3 is a schematic flow chart of processings effected by the printer driver program 3 of this Embodiment. FIG. 4 is a flow chart of the spool processing of FIG. 3. FIG. 5 is a flow chart of transfer processing of FIG. 3.

A description is first given of the control procedure of the printer driver 3. In step S1, spool processing is carried out. That is, a drawing order is obtained from the application program 1 and stored in the spool file, the number of colors is counted, and a color table is created. In the subsequent step S2, transfer processing is carried out. In this step, image data is developed on the off screen 7 by processing based on the number of colors according to the drawing order of the spool file 6, color processed and transferred to the printer.

The above processings are repeated for image data for all pages (step S3).

The spool processing (S1) and the transfer processing (S2) are described in detail with reference to FIGS. 4 and 5.

In step S101 of FIG. 4, the color number counter 4 is initialized. In step S102, the color table 5 for storing image data indicative of colors used at the time of drawing and corresponding to indices is initialized. The color table 5 for storing 256 colors is prepared for transfer processing. In step S103, the spool file 6 is initialized. In step S104, a drawing order is obtained from the application program 1. The drawing order specifies colors to be drawn. In step S105, it is checked if the specified colors are already recorded in the color table 5. When the colors are recorded, the routine proceeds to step S108, and when not, the routine proceeds to step S106. Step S106 is for count processing of the color number counter 4, and step S107 is for recording processing of colors specified in step S104. When the number of colors specified exceeds the maximum number of colors recorded in the color table 5, new colors specified are not recorded. Step S108 is for spool processing of the drawing order. In step S109, it is checked if drawing is completed. When drawing for one page is completed, the routine proceeds to step S110, and when not, to step S104. Step S110 is for storage processing of the color number counter 4 in the spool file 6 and step S111 is for storage processing of the color table 5 in the spool file 6.

According to the spool processing of this Embodiment, a color table can be created according to an input image.

Steps S201 to S207 shown in FIG. 5 are for initializing transfer processing and steps S208 to S213 are for actual transfer processing. In step S201, the color number counter is obtained from the spool file 6. The color number counter indicates the number of colors used for drawing. In step S202, the color table is obtained from the spool file 6.

In steps S203 to S207, an off screen 7 which can effect the optimum color reproduction from the number of used colors is created. The term "off screen" as used herein means a memory space invisible on the display screen, in which an image can be drawn. In step S203, it is checked if the number of used colors is two—black and white. When only these two colors are used, the routine proceeds to step S204 to create a one-bit off screen 7.

In step S205, it is checked if the number of used colors is 256 or less. When it is 256 or less, the routine proceeds to step S206 to create an 8-bit off screen 7. That is, a memory space which can represent the maximum of 256 colors is created. In this case, although different colors can be assigned to 0-th to 256-th colors, colors recorded in the color table 5 are used. Step S207 is for the case where the number of used colors is larger than 256. In this case, a 32-bit off screen is created. That is, a memory space which can represent the maximum number of colors of the host computer is created.

Step S208 is for spool image drawing processing for the created off screen 7 based on the drawing order.

In step S208, a spool image is drawn on the off screen having a depth per pixel in accordance with an input image and created in step S204, S206 or S207.

In other words, when a 32-bit off screen is created, RGB image data specified by the drawing order are directly developed on the off screen.

When a 1-bit off screen is created, image data are developed on the off screen in 1-bit configuration because the input image is a binary monochrome image.

When an 8-bit off screen is created, image data are converted into indices using the color table and the indices are developed on the off screen.

In step S209, the off screen is checked. When it is a 1-bit off screen, the routine proceeds to step S212 since there is no need for color conversion in step S210 and binarization in step S211 because the image is a binary monochrome image. In step S210, the RGB color space of the host computer 9 is converted into the CMYK color space of the printer 8. In concrete terms, intensity conversion, masking and black generation processings are carried out. In step S211, CMYK data are converted into binary data. In step S212, the binary data are transferred to the printer. Step S213 is for checking band processing. Steps S208 to S214 are repeated until the processing of all bands are completed.

(Variation of Embodiment 1)

A description is subsequently given of another Embodiment of the present invention. In the above Embodiment, the number of colors is counted for each page. This is carried out for each band so that the optimum off screen 7 can be prepared for each band. For instance, in most cases, a monochrome text portion is separated from an image portion in one page. In this case, when the optimum off screen 7 can be prepared for each band, more efficient processing can be carried out.

As described above, according to this Embodiment, since an off screen is created for each band or each page according to the number of used colors, when the number of used colors is small (S204, S206), a large number of drawing commands can be executed by one time of developing processing with a predetermined memory capacity compared with regular processing (S207).

Effective use of a memory and high-speed printing are made possible by recording the number of used colors and actual colors for each page or each band and creating an off screen and carrying out color processing the most suitable for the number of used colors and actual colors.

(Embodiment 2)

Figure 6:
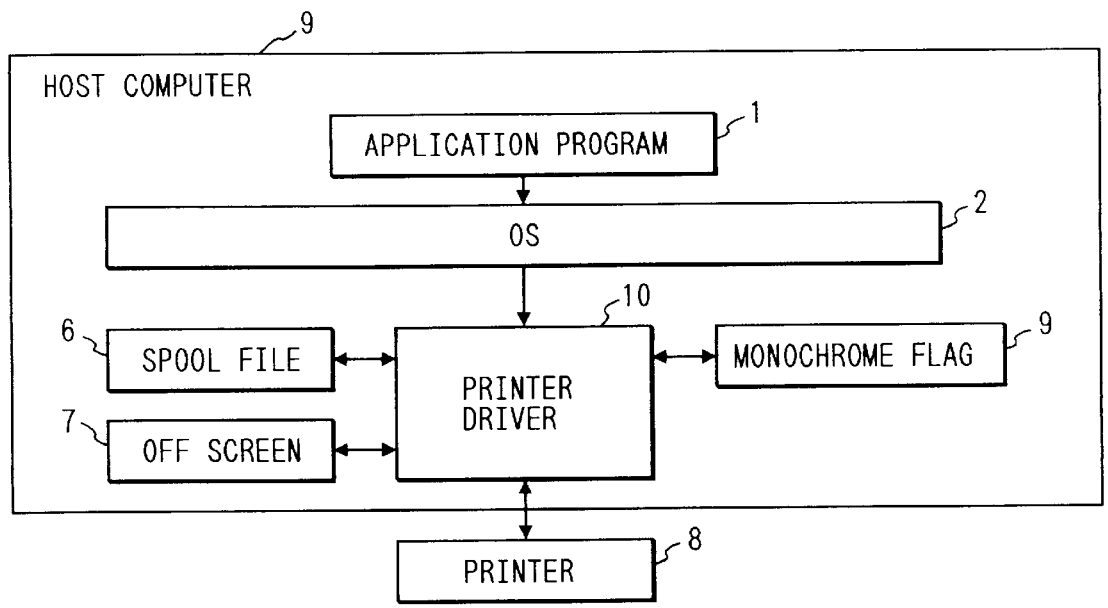
FIG. 6 is a diagram showing the exemplary hierarchy of a printer driver program according to Embodiment 2 of the present invention.

FIG. 6 shows the configuration of the software of a host computer involved in the control of the printer according to Embodiment 2 of the present invention. That is, it shows the hierarchy of the application program 1, OS 2 and printer driver 10 used in the host computer 9 and the printer 8.

The printer driver 10 is subordinate to the OS 2 and receives a drawing order from the application program 1 through the OS 2, converts it into a printing order comprehensible to the printer 8 and transfers the printing order to the printer 8.

The printer 8 is a raster printer which prints an image in accordance with bit map images using a bit matrix system and draws an image in units of a 1-dot (pixel) line corresponding to 1 bit of a bit map. Since this raster printer does not have a complex drawing order, the printer driver 3 stores the drawing order obtained from the application program 1 in the spool file 6 temporarily, forms a bit map image on the off screen 7 using the order at the time of transfer, and transfers the data to the printer 8. In the case of color printing, R, G and B bit map images are formed on the off screen 7 according to the drawing order for an RGB color image, data on each line of the image are processed as will be described hereinafter to form CMYK color and monochrome output image data, and these image data are transferred to the printer 8 for color printing.

A monochrome flag 9 is a flag indicating whether each line of the output image is colored or monochrome as will be described hereinafter.

The monochrome flag 9 is written to the RAM 15 and written to or read from a hard disk drive 16 as required. The spool file 6 is written to the disk of the hard disk drive 16. The off screen 7 is formed on a predetermined area of the RAM 15.

A description is subsequently given of the control operation of the printer driver 10 when it causes the printer 8 to perform color printing according to a drawing order from the application program 1 in the above configuration with reference to FIGS. 7 to 9.

Figure 7:
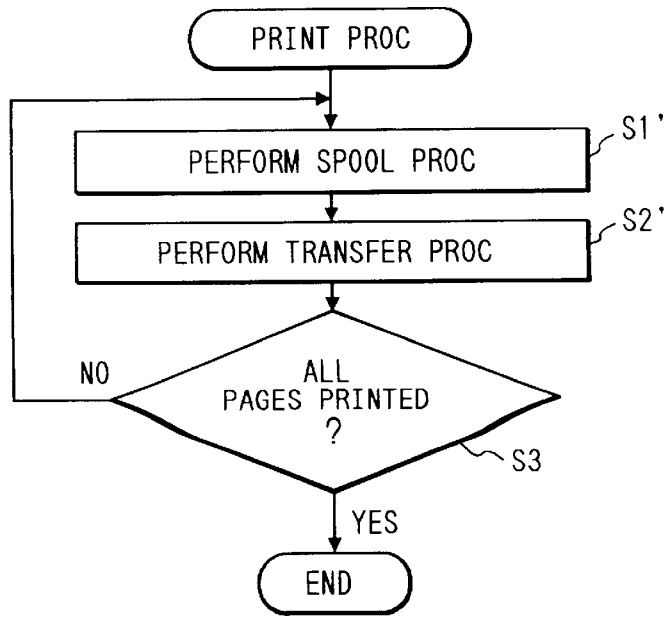
FIG. 7 is a diagram showing an exemplary printing processing flow according to Embodiment 2 of the present invention.

FIG. 7 shows schematically the control procedure of the printer driver 10. As shown in FIG. 7, spool processing is carried out in step S1'. That is, the drawing order is obtained from the application program 1 and written to the spool file 6. At this point, an image to be output according to the drawing order is checked to form a monochrome flag 9.

Transfer processing is then carried out in step S2'. In this step, R, G and B color bit map images are first drawn on the off screen 7 in accordance with the drawing order stored in the spool file 6, and these image data are processed to form output image data. Now, different processings are carried out depending on whether each line of the bit map image is colored or monochrome, indicated by the monochrome flag, to form CMYK color or monochrome output image data. The thus formed output image data for each line are transferred to the printer 8 for printing.

After transfer and printing of data for one page are completed, it is determined whether or not printing of all pages is completed according to an order from the application program 1 in step S3. When it is determined that printing of all pages is not completed, the processings of steps S1' and S2' are repeated to print an image of the following page.

A detailed description is subsequently given of the spool processing in step S1' and transfer processing in step S2' shown in FIG. 7 with reference to FIGS. 8 and 9.

The spool processing is carried out in accordance with a processing procedure shown in FIG. 8 as follows.

In step S401, a monochrome flag area is prepared on the RAM 15 for the number of lines of one page. The term "line" as used herein denotes a line having the height of 1 dot (pixel) corresponding to 1 bit of a bit map. When the length of one page of a printer having a printing speed of 360 dpi is 11 inches, a space for 3,960 flags is prepared.

In step S402, prepared monochrome flag data are initialized. When there is no image to be drawn, nothing is printed. Therefore, all the flags are set monochrome.

In step S403, a spool file is initialized.

In step S404, a drawing order is obtained from the application program. This drawing order includes information on which area, that is, from which line to which line should be drawn in what colors.

Subsequent steps S405 to S410 are for checking colors to be drawn, which is related to the feature of the present invention.

In step S405, a coordinate indicating an upper end of a drawing area specified by the drawing order, that is, a numeral indicating which line from the top in the bit map for the first page, is assigned to a variable line.

In step S406, it is determined whether the variable line-th line of an image to be output according to the drawing order is drawn in monochrome or color. When it is determined the line is drawn in monochrome, the routine proceeds to step S407, and when it is determined it is drawn in color, the routine proceeds to step S408. The term "monochrome" as used herein means that the line is drawn in solid black and white colors only. The term "color" as used herein is intended to denote other colors in addition to black and white and include gray when specified.

In step S407, in the arrangement of monochrome flags, a line-th flag is set monochrome.

In step S408, in the arrangement of monochrome flags, a line-th flag is set color.

In step S409, the variable line is incremented by 1 to set a flag for the following line.

In step S410, it is checked if the variable line reaches a lower end of the drawing area, that is, whether all the monochrome flags are set for the entire drawing area. When all the flags have been set for the entire drawing area, the routine proceeds to step S411, and when not, the routine returns to step S406 to repeat steps S406 to S410.

In step S411, the drawing order obtained in step S404 is recorded in the spool file.

In step S412, it is checked if acquisition of the drawing order for one page from the application program is completed. When completed, the routine proceeds to step S413, and when not, returns to step S404 to repeat steps S404 to S412.

In step S413, the monochrome flags set are recorded in the spool file and spool processing is completed.

In the spool processing of this Embodiment, a flag indicating monochrome or color is set for each line.

Next, transfer processing is carried out in accordance with a processing procedure shown in FIG. 9 as follows.

Figure 9:
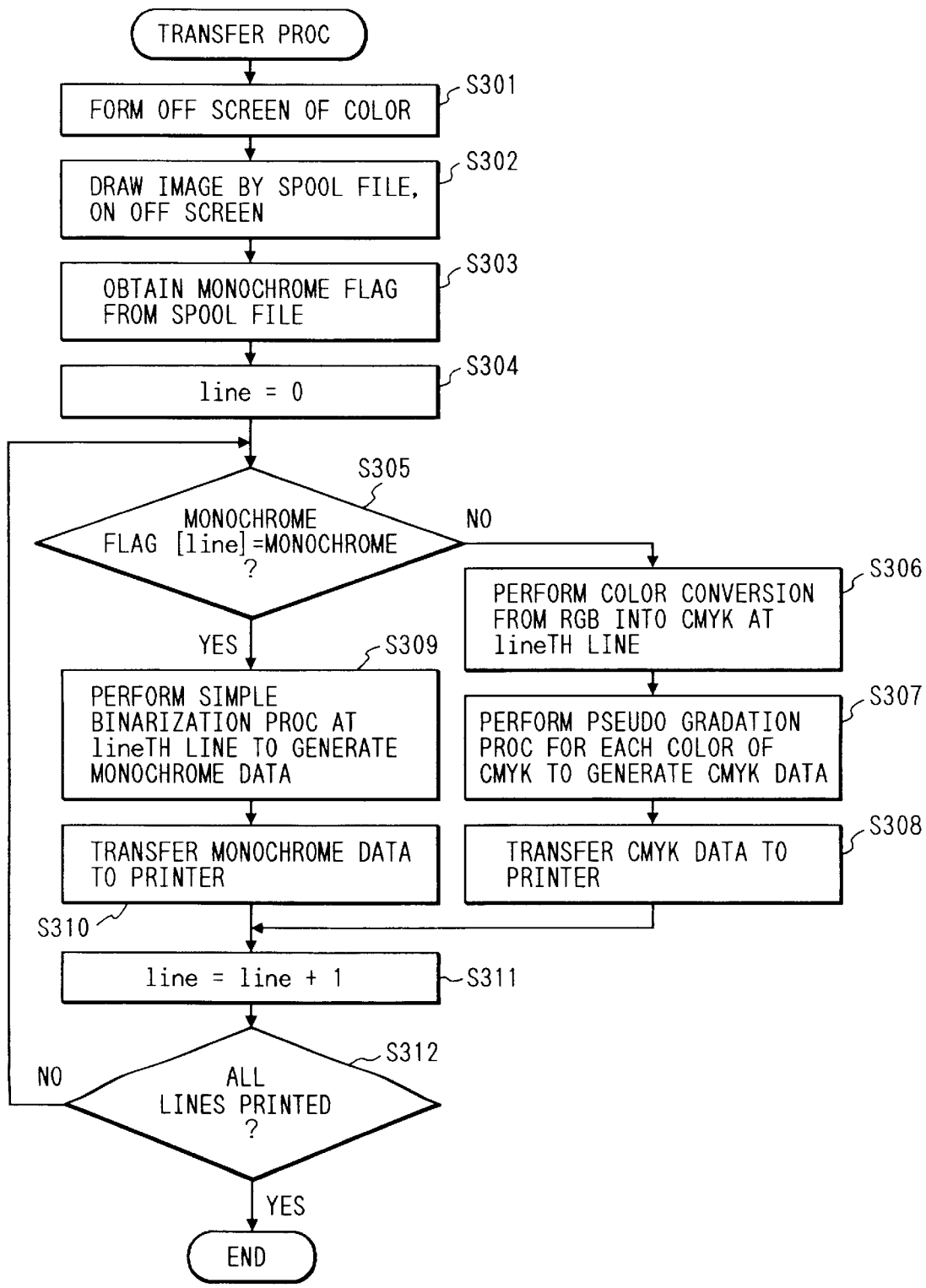
FIG. 9 is a diagram showing an exemplary transfer processing flow according to Embodiment 2 of the present invention.

In step S301 of FIG. 9, an RGB off screen is formed on the RAM 15.

In step S302, an RGB color image is drawn on the off screen according to the drawing order stored in the spool file.

In step S303, a monochrome flag is obtained from the spool file.

Actual transfer processing begins in step S304 in which the variable line is initialized to "0".

In step S305, a line-th monochrome flag is checked. When it is color, the routine proceeds to steps S306 to S308, and when it is monochrome, the routine proceeds to steps S309 and S310.

When the flag is color, an image on a line-th line is converted from RGB colors into CMYK colors in step S306.

In the subsequent step S307, converted CMYK images are subjected to pseudo gradation processing to convert them into binary data. The term "pseudo gradation processing" as used herein means error diffusion processing or dither processing. In addition to the pseudo gradation processing, color compensation processing may be carried out.

In the following step S308, the binary CMYK data are transferred to the printer 8 as output image data to print one line.

When the flag is monochrome, monochrome image processing which is related to the feature of the present invention is carried out in steps S309 and S310. First, in step S309, an image on a variable line-th line is subjected to simple binarization processing to convert it into binary data for a solid black and solid white monochrome. The term "simple binarization processing" as used herein means a binarization process for determining "0" or "1" based on a certain threshold value. For instance, when a bit in a line is all "1" in R, G and B, it is white at "0", and when it is all "0" in R, G and B, it is black at "1".

In the subsequent step S310, the created binary monochrome data are transferred to the printer as output image data to print one line.

In step S311 following step S308 or S310, the variable line is incremented by 1 to carry out processing for the following line.

In step S312, it is checked if all the lines of an image are printed. When not printed, the routine returns to step S305 to repeat steps S305 to S312, and when printed, transfer processing is completed.

As described above, in the spool processing, it is checked if each line of an image to be output according to a drawing order obtained from the application program is monochrome or colored to set a monochrome flag, and the drawing order and the monochrome flag are stored in the spool file. In the transfer processing, R, G and B color bit map images are drawn on the off screen in accordance with the drawing order and then it is checked from the monochrome flag if each line of the image is monochrome or colored. When it is colored, color conversion processing from RGB colors into CMYK colors as well as pseudo gradation processing or color compensation processing are carried out, and when it is monochrome, only simple binarization processing is carried out, to form output image data which are then output to the printer for printing.

In other words, in the formation of output image data, a colored area of the output image is subjected to color conversion processing as well as pseudo gradation processing or color compensation processing as in the prior art. However, since a monochrome area of the output image is subjected to simple binarization processing only, excluding the color conversion processing and pseudo gradation processing or color compensation processing, the processing of forming output image data can be carried out efficiently, thereby making it possible to improve processing speed.

(Variation of Embodiment 2)

In the above Embodiment, color printing is performed by a color printer. The same technique can be applied when gray scale printing is performed by a monochrome printer.

Figure 8:
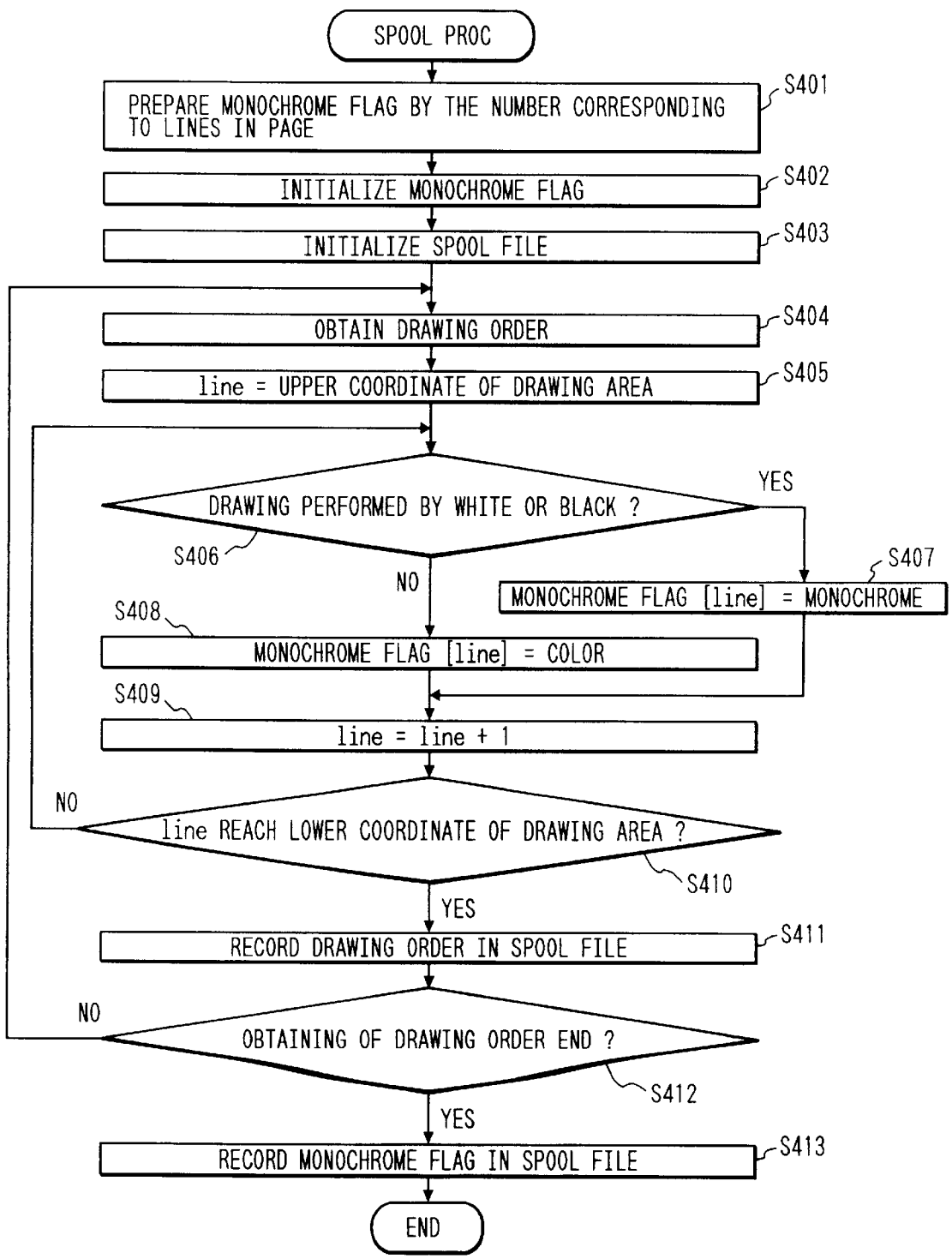
FIG. 8 is a diagram showing an exemplary spool processing flow according to Embodiment 2 of the present invention.

In this case, for the spool processing, after steps S401 to S405 of FIG. 8 as described above are performed, it is checked if the drawing color of a variable line-th line of an image to be output according to the drawing order is monochrome (solid black and white) or gray in step S406. According to this result, a monochrome flag is set monochrome or gray in step S407 or S408. Thereafter, steps S409 to S413 are performed similarly.

For the transfer processing, after steps S301 to S304 of FIG. 9 are performed similarly, a line-th monochrome flag is checked in step S305. When it is monochrome, the line-th line is subjected to simple binarization processing in step S309 similarly to form monochrome output image data. When it is gray, the line-th line is subjected to color conversion processing from RGB into gray in step S306, and pseudo gradation processing or color compensation processing is carried out on gray in step S307 to form gray binary data as output image data. The processings of subsequent steps S308 and S310 to S312 are the same as described above.

According to this Embodiment, color conversion processing into gray and pseudo gradation processing or color compensation processing are carried out on a gray line of an image to be output, whereas only simple binarization processing is carried out on a monochrome line. Therefore, compared with conventional gray-scale printing in which color conversion processing into gray and pseudo gradation processing or color compensation processing are carried out on all the areas of an image, the processing of forming output image data can be carried out efficiently, thereby making it possible to improve processing speed.

As for lines not to be drawn according to the drawing order in the spool processing, information indicating drawing is not performed is stored in the spool file and referred to at the time of transfer processing, thereby making it possible to eliminate even the simple binarization processing for areas not to be drawn.

In the above Embodiment, for color printing, since colors specified by the drawing order are RGB colors and colors to be printed are CMYK colors, color conversion processing from RGB colors into CMYK colors is carried out. It is possible that colors specified by the drawing order are colors other than RGB and colors to be printed are colors other than CMYK. In this case, different color conversion processing is carried out. In this case, the method of the present invention is also effective which makes different the processing of image data according to the above monochrome flag.

In addition, according to the above Embodiment, the drawing color of an area for each line is checked and different processing is carried out according to its result to form output image data. Or, the drawing color of an area for a plurality of lines or a predetermined area, for example, a 1/n portion (n>2) of one page, may be checked and different processing may be carried out according to its result to form output image data.

As being obvious from the above description, according to the printer control method and printer control apparatus of the present invention, when output image data to be printed in colors according to a drawing order are formed for a color printer, it is checked if the drawing color of each predetermined area of an image to be output is colored or monochrome, and predetermined color processings are carried out on a colored area to form output image data, whereas simple binarization processing is carried out on a monochrome area to form output image data. Therefore, the processing of forming output image data can be carried out efficiently at a high speed advantageously.

When output image data to be printed in gray scale according to a drawing order are formed for a monochrome printer, it is checked if the drawing color of each predetermined area of an image to be output is gray or monochrome, and predetermined gray processings are carried out on a gray area to form output image data, whereas simple binarization processing is carried out on a monochrome area to form output image data. Therefore, the processing of forming output image data can be carried out efficiently at a high speed advantageously.

(Embodiment 3)

Embodiment 1 shows a technology for creating an off screen suitable for the characteristics of an input image. Embodiment 2 shows a technology for carrying out color conversion processing suitable for the characteristics of an image developed on the off screen. Embodiment 3 will show processing when technologies of Embodiments 1 and 2 are combined efficiently.

Figure 10:
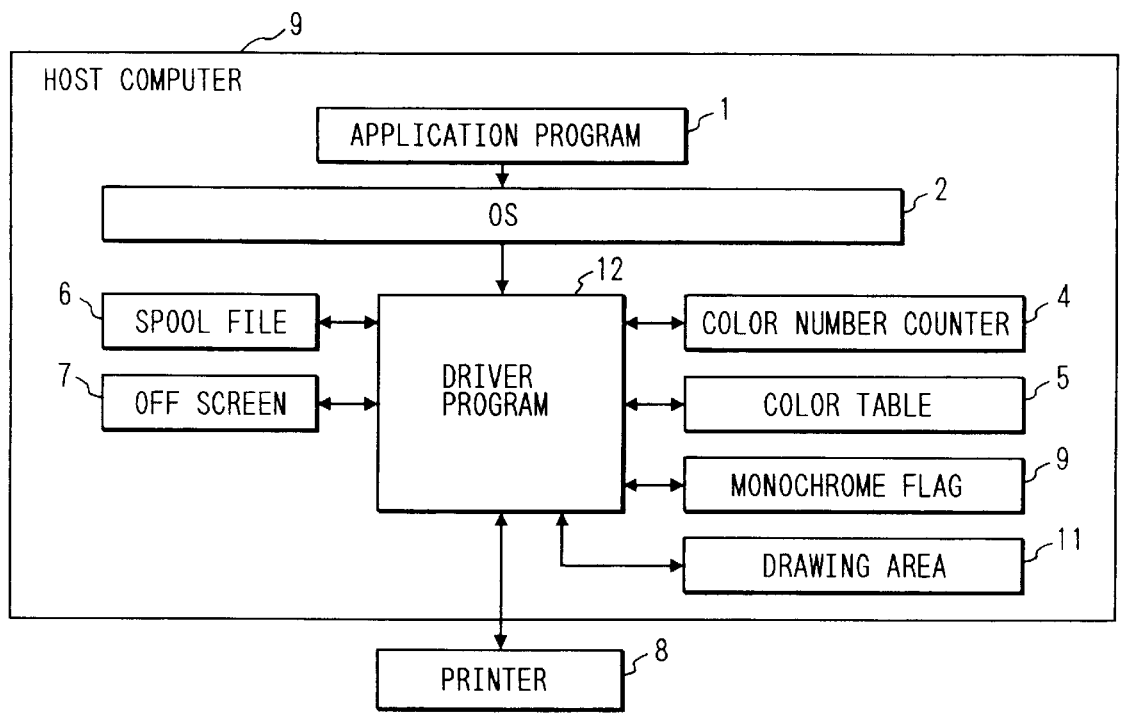
FIG. 10 is a diagram showing the exemplary hierarchy of a printer driver program according to Embodiment 3 of the present invention.

The configuration of the software of the host computer involved in the control of a printer is shown in FIG. 10.

The host computer 9 is constituted by the application program 1, OS 2, spool file 6, off screen 7, color number counter 4, color table 5, monochrome flag 9, drawing area 11 and driver program 12.

The processing of this Embodiment 3 based on the above configuration is described hereinunder with reference to FIGS. 11 to 20.

Figure 11:
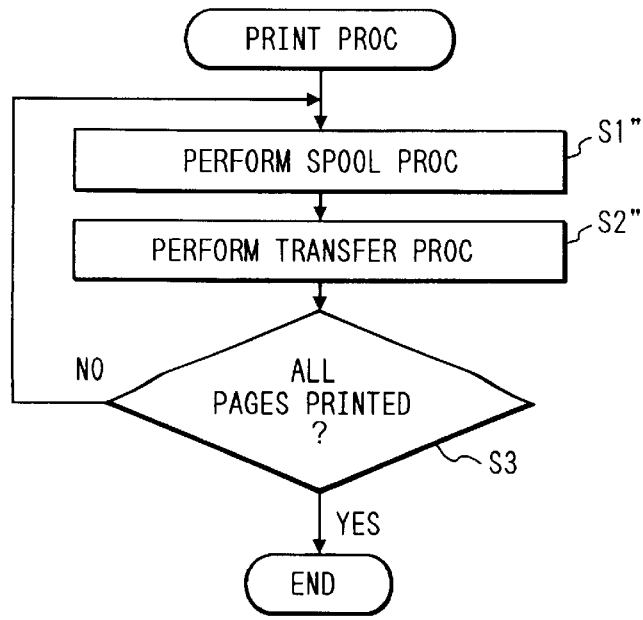
FIG. 11 is a diagram showing an exemplary printing processing flow according to Embodiment 3 of the present invention.

FIG. 11 shows schematically a control procedure of the printer driver.

Figure 12:
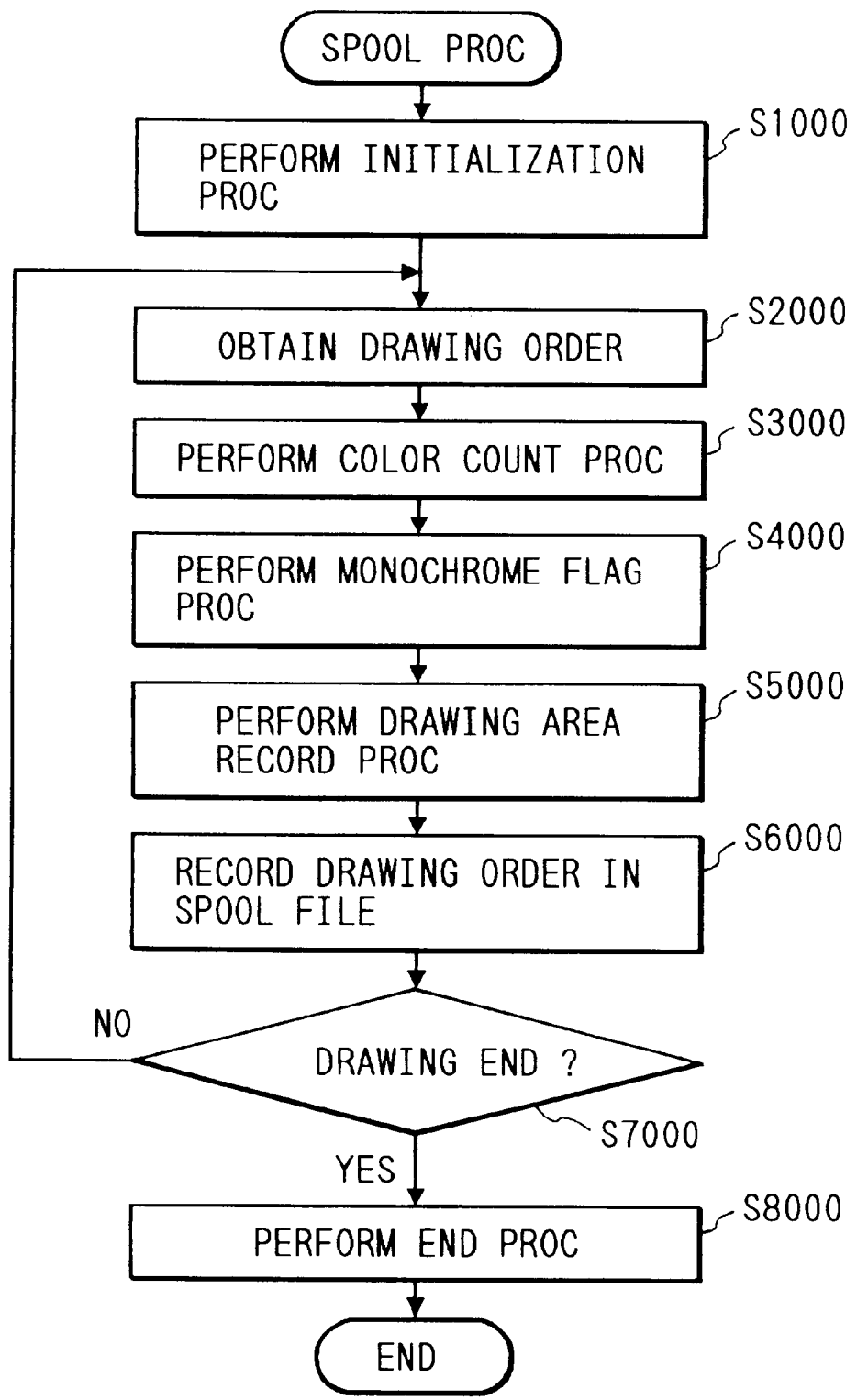
FIG. 12 is a diagram showing an exemplary spool processing flow according to Embodiment 3 of the present invention.

FIG. 12 shows a spool processing flow in S1".

Figure 13:
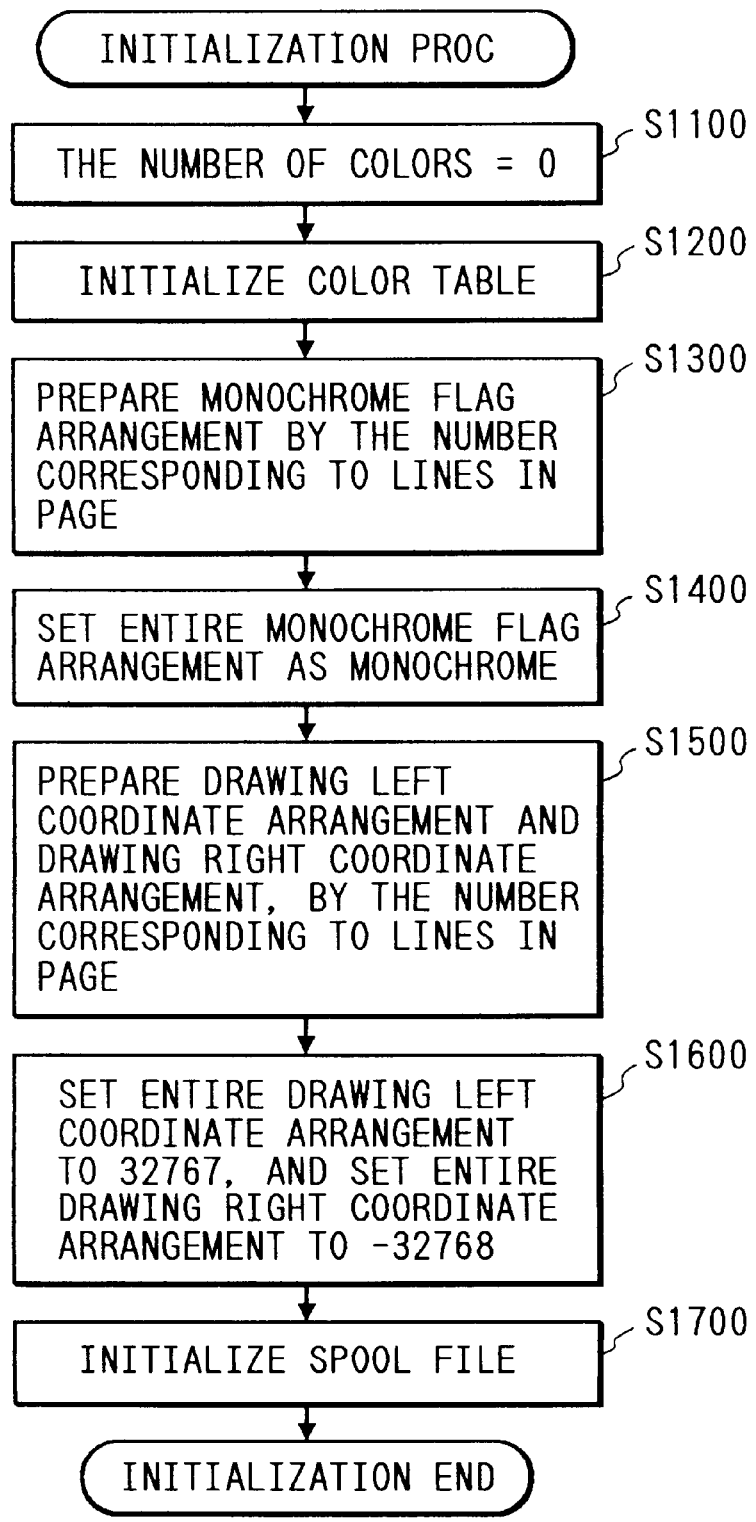
FIG. 13 is a diagram showing an exemplary initialization processing flow according to Embodiment 3 of the present invention.

In step S1000, as shown in FIG. 13, the color number counter (S1100), the color table (S1200), the monochrome flags (S1300, S1400), the drawing area (S1500, S1600) and the spool file (S1700) are initialized.

In the processing of initializing the drawing area, to determine a drawing area for each line, drawing left coordinate arrangement and drawing right coordinate arrangement are prepared corresponding to the number of lines in a page (S1500) and the entire drawing left and right coordinate arrangements are set to the maximum values (S1600).

In this Embodiment, each coordinate arrangement is represented by 17 bits including 1 bit indicating positive or negative. Therefore, the coordinate arrangements can represent from −32767 to +32768.

In step S2000, drawing orders indicative of respective objects of images and constituted by input drawing commands and color specification commands are subsequently obtained, which are constituted by input image drawing commands and color specification commands.

Figure 14:
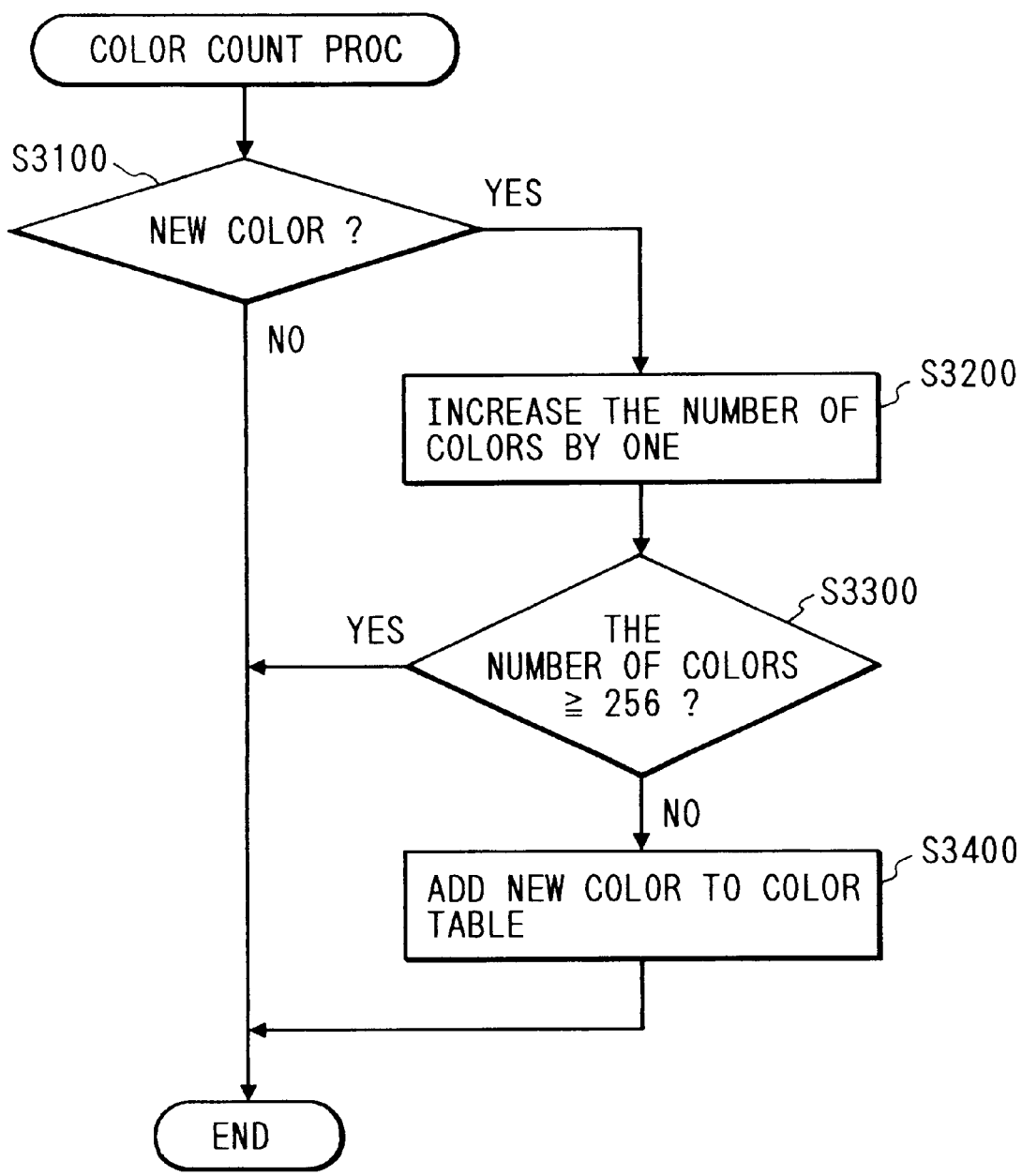
FIG. 14 is a diagram showing an exemplary color count processing flow according to Embodiment 3 of the present invention.

In step S3000, color count processing shown in FIG. 14 and corresponding to steps S105 to S107 of FIG. 4 in Embodiment 1 is carried out. That is, the drawing order is analyzed, the number of colors is counted (S3200) and a color table in which a predetermined number of colors can be set dynamically is created.

Figure 15:
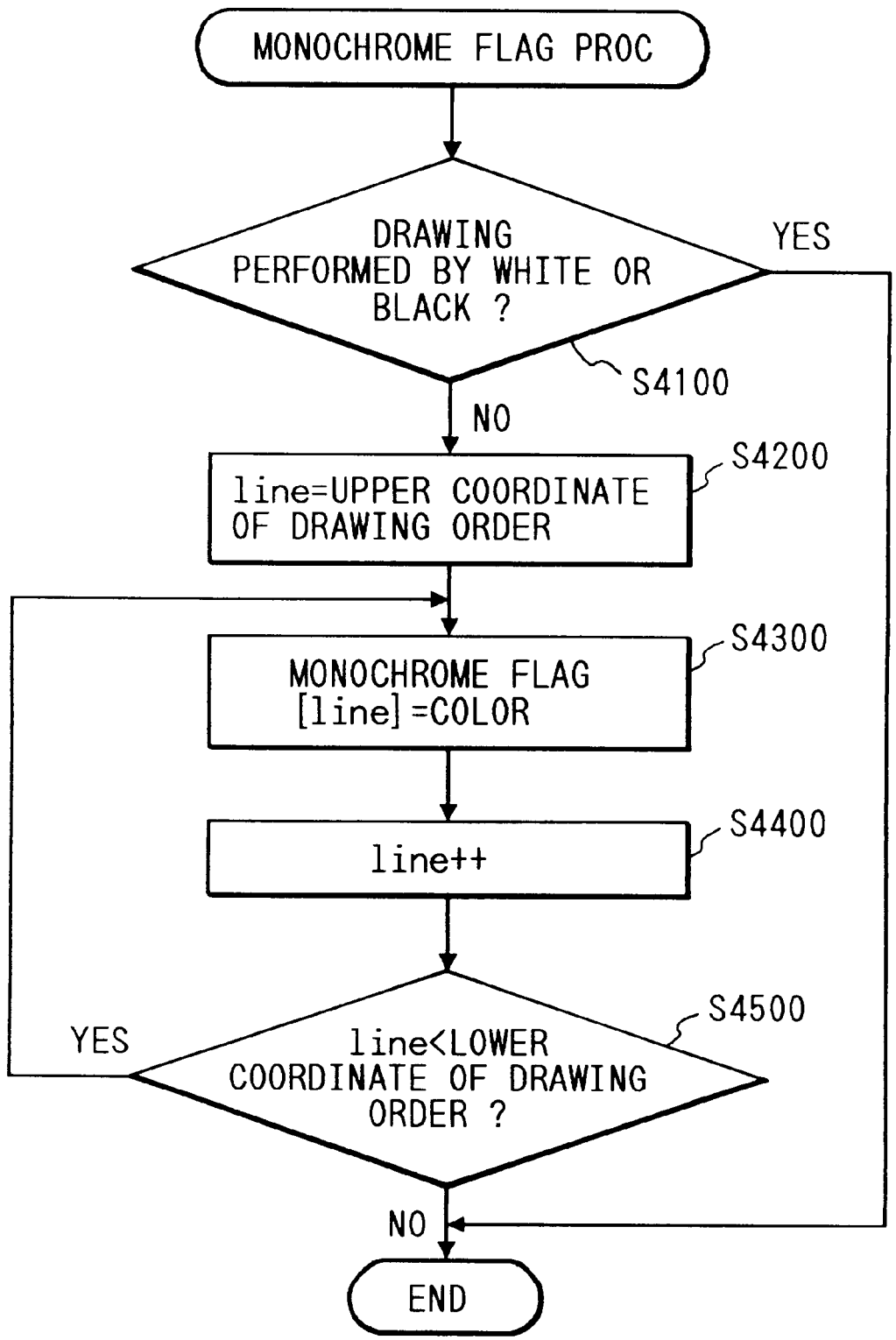
FIG. 15 is a diagram showing an exemplary monochrome flag processing flow according to Embodiment 3 of the present invention.

In step S4000, monochrome flag processing shown in FIG. 15 and corresponding to steps S406 to S410 of FIG. 8 in Embodiment 2 is carried out using the arrangement of monochrome flags (which are set monochrome as an initial value and prepared in the initialization processing).

In step S5000, drawing area recording processing in which the drawing order is analyzed to determine a drawing area for each line is carried out.

Figure 16:
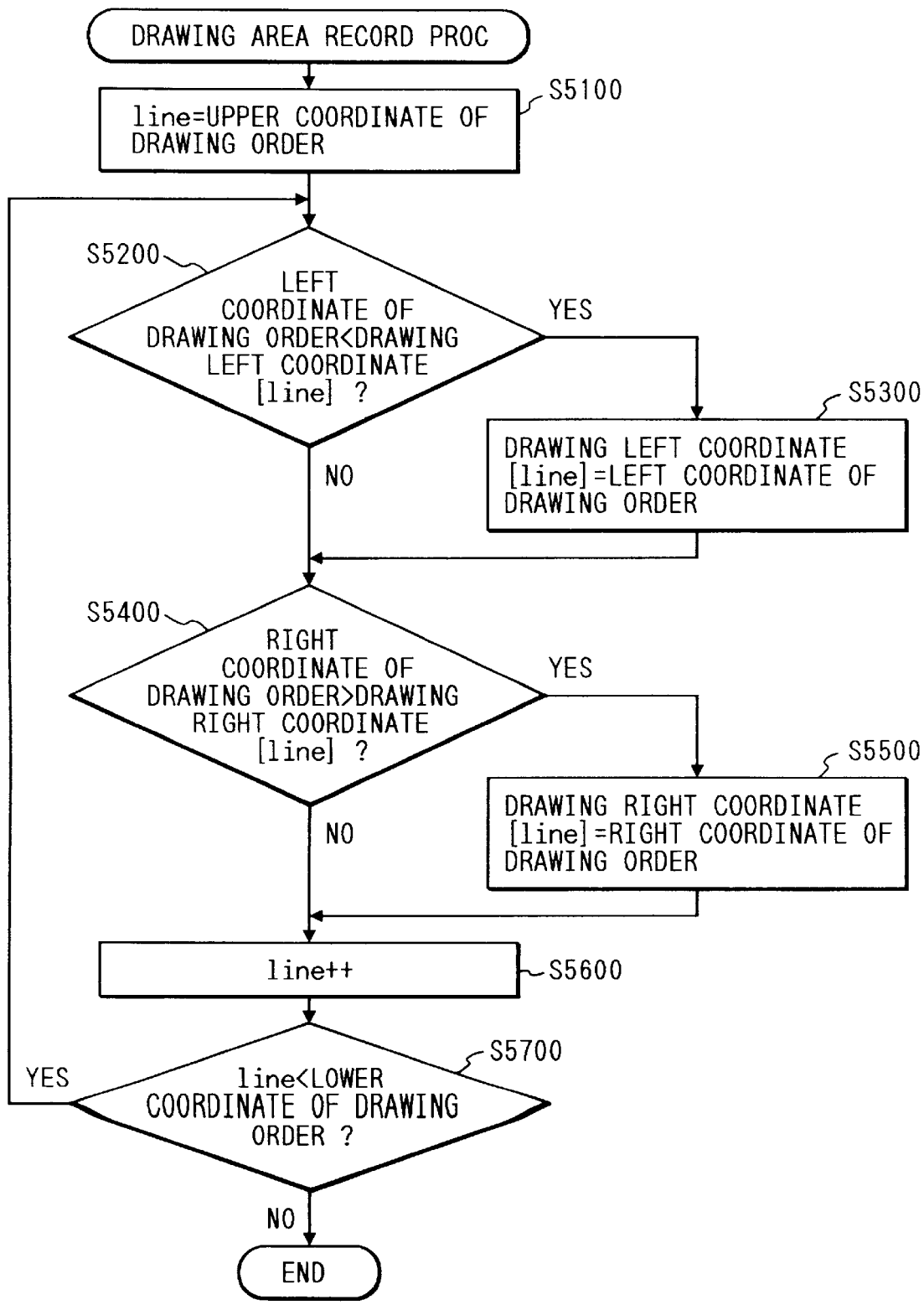
FIG. 16 is a diagram showing an exemplary drawing area recording processing flow according to Embodiment 3 of the present invention.

FIG. 16 shows this drawing area recording processing flow. In the drawing area recording processing, the drawing order is analyzed and a drawing area is set for each line according to the drawing order like other processings.

In step S5100, the upper coordinate of an image of an object specified by the drawing order is set to a line. In step S5200, it is determined whether a left coordinate in a predetermined line based on the analysis result of the drawing order is smaller than the preset drawing left coordinate in the predetermined line.

In step S5100, when it is determined that the left coordinate is smaller in step S5100, the drawing left coordinate is renewed in step S5300.

Similarly, in step S5400, it is determined whether a right coordinate in a predetermined line is larger than the preset drawing right coordinate in the predetermined line.

When it is determined that the right coordinate is larger in step S5400, the drawing right coordinate is renewed in step S5500.

In step S5600, the line to be set is changed. The above processings are carried out on all the lines of the drawing area according to the drawing order (S5700).

In step S6000, the drawing order according to which the above processings have been carried out is stored in the spool file 6.

In step S7000, the above processings are repeated for all drawing orders.

Figure 17:
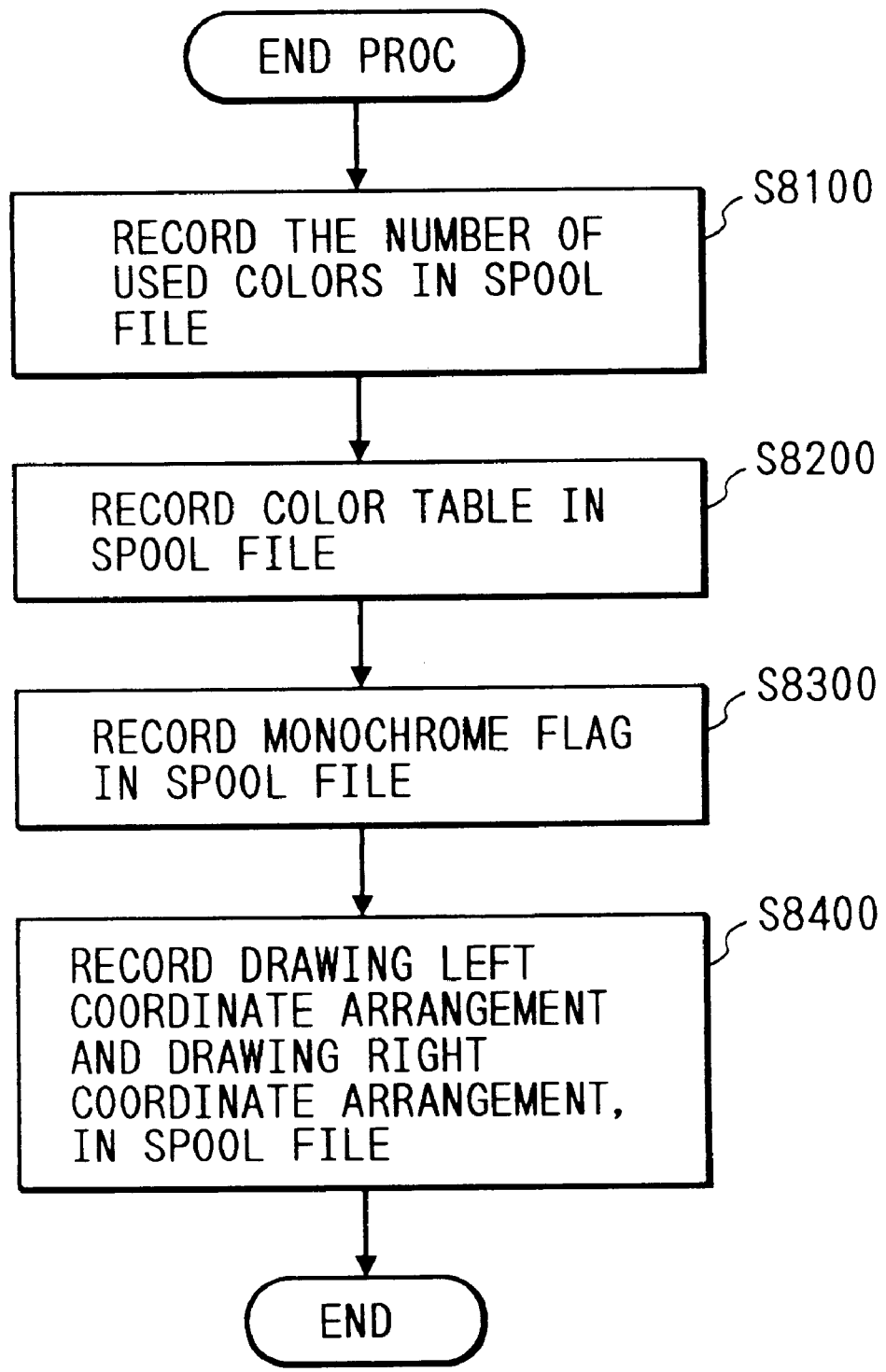
FIG. 17 is a diagram showing an exemplary end processing flow according to Embodiment 3 of the present invention.

In step S8000, end processing shown in FIG. 17 is carried out. That is, the number of colors (S8100), the color table (S8200), the monochrome flags (S8300) and the drawing area (S8400) are stored in the spool file 6.

In the spool processing, color count processing (S3000), monochrome flag processing (S4000) and drawing area recording processing (S5000) are carried out sequentially according to each drawing order.

Like this Embodiment, the processing of identifying the characteristics of the input image is carried out by the analysis of a drawing order, thereby making possible high-speed identification.

Figure 18:
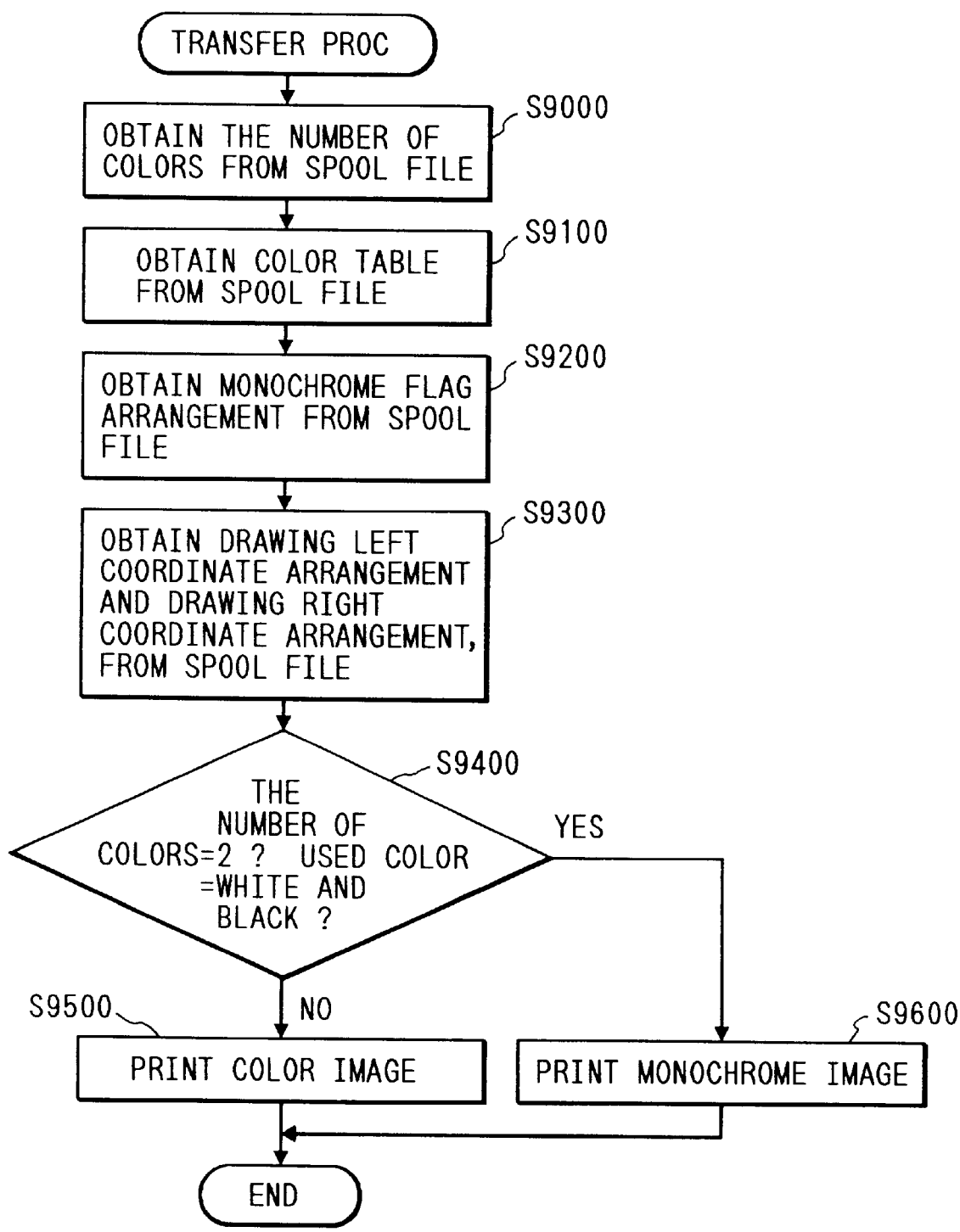
FIG. 18 is a diagram showing an exemplary transfer processing flow according to Embodiment 3 of the present invention.

FIG. 18 shows a transfer processing flow in step S2".

In steps S9000, S9100, S9200 and S9300, the number of colors, the color table, the arrangement of monochrome flags and the drawing area (drawing left coordinate arrangement and drawing right coordinate arrangement) set by the spool processing are obtained.

In step S9400, it is determined whether an image is a monochrome image or a color image based on the number of colors.

When the image is a color image, color image printing is performed in step S9500. On the other hand, when the image is a monochrome image, monochrome image printing is performed in step S9600.

Figure 19:
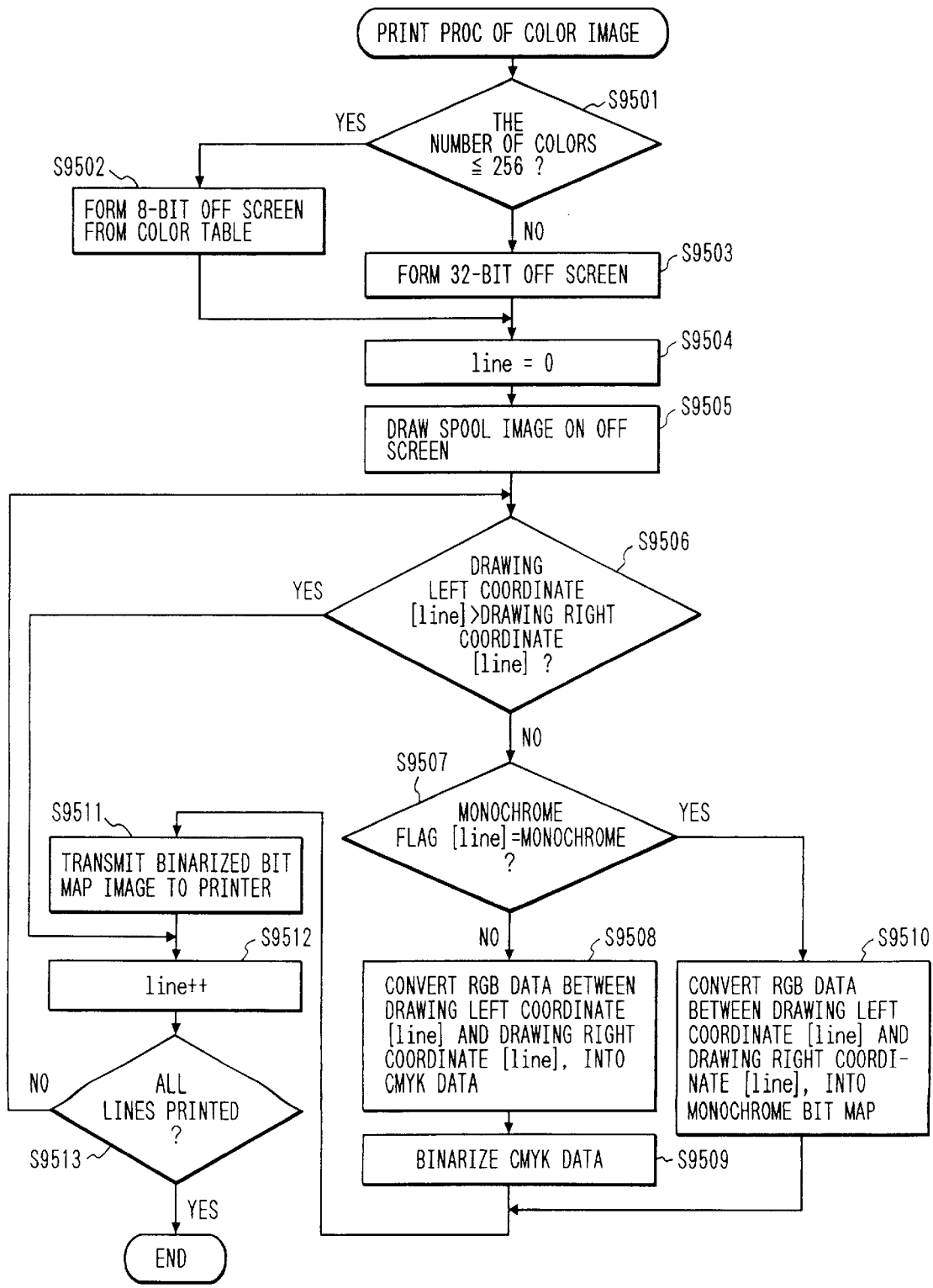
FIG. 19 is a diagram showing an exemplary printing processing flow for a color image according to Embodiment 3 of the present invention.
Figure 20:
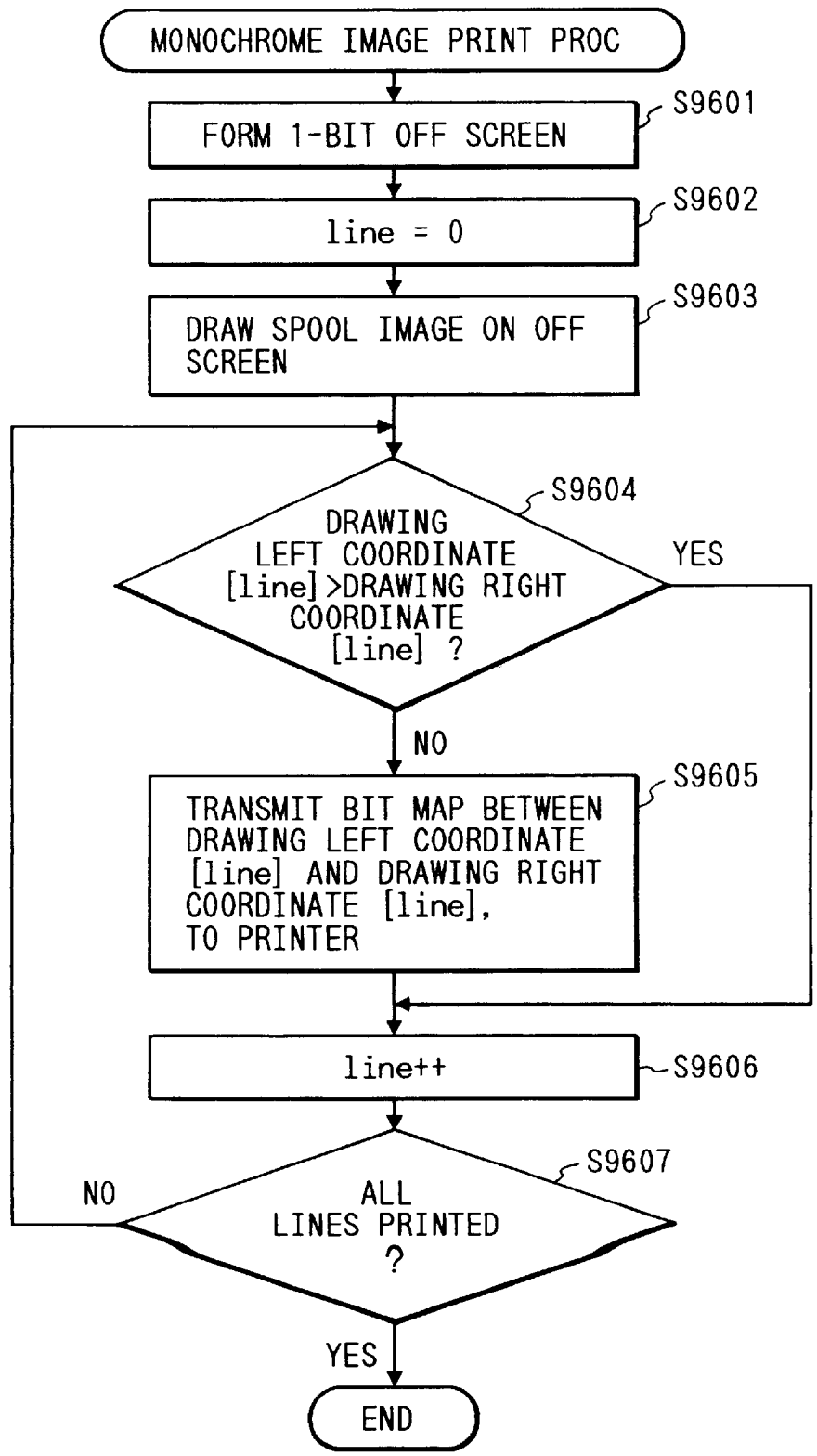
FIG. 20 is a diagram showing an exemplary printing processing flow for a monochrome image according to Embodiment 3 of the present invention.

Processings for color image printing and monochrome image printing are described with reference to FIGS. 19 and 20.

A description is first given of color image printing processing.

To create an off screen according to the number of colors of a color image, processing corresponding to the off screen creation processing (S205 to S208 in FIG. 5) in Embodiment 1 is carried out (S9501 to S9505).

In step S9504, a line initial value is set to "0".

In step S9506, it is determined whether or not there exists a drawing area in a predetermined line of an image developed on the off screen by comparing the drawing left coordinate with the drawing right coordinate in the predetermined line. In other words, it is determined whether the drawing left coordinate is larger than the drawing right coordinate. When the drawing left coordinate is smaller, it is determined that there exists a drawing area.

Thereafter, processing corresponding to the processing (S305 to S310 in FIG. 9) of converting the developed image of Embodiment 2 into binary data to be transmitted to the printer is carried out (S9507 to S9509).

Parameters for the respective processings are set such that processing results in the total of three modes—color image processing for a predetermined area (S9508), monochrome image processing (S9510) for the predetermined area and monochrome image printing processing—which are carried out in image printing processing are made identical in black and white.

In other words, parameters for masking processing and inking processing which are carried out in color image processing for the predetermined area (S9508) are controlled to achieve conformity with the processing results of other modes.

In this Embodiment, for image data indicating black, it is set such that an image is drawn only in black.

This invention is not limited to this Embodiment, but it may be any Embodiment, provided conformity is achieved in three modes, i.e., black and/or white.

The above processings are repeated for all the lines (S9512, S9513).

A description is subsequently given of monochrome image printing processing with reference to FIG. 20.

Since the input image is a monochrome image, a 1-bit off screen is created (S9601).

A line initial value is set to "0" (S9600).

An image is developed on the created off screen according to the drawing order (S9603).

It is determined whether there exists a drawing area for each line (S9604). When there exists the drawing area, a bit map for the drawing area is transferred to the printer (S9605).

The above monochrome image printing processing for each line is performed for all the lines (S9606, S9607).

The above Embodiments have been described in which all the processings are carried out by the printer driver (host computer). The above configuration of the present invention can be applied to the control of a controller which carries out image printing processing based on output image data formed in the printer itself.

The present invention may be applied to a printer driver of an image forming apparatus for forming an image based on multi-value data.

The present invention may also be applied to a controller in an image forming apparatus.

It is needless to say that the present invention can be applied in the case where a recording medium storing a software program for attaining the present invention is provided to a system or an apparatus so that the system or apparatus reads and executes the program stored in the recording medium to attain the present invention. The recording medium for supplying the program is selected from a floppy disk, hard disk, optical disk, opto-magnetic disk, CD-ROM, CD-R, magnetic tape, nonvolatile memory card, ROM and the like.

While the invention has been particularly shown and described with reference to preferred embodiments thereof, it will be understood by those skilled in the art that the foregoing and other changes in form and details can be made therein without departing from the spirit and scope of the invention.

What is claimed is:

1. An image processing apparatus comprising:

input means for inputting drawing orders for forming an image to be output;

count means for counting the number of colors included within a predetermined area in the image, by analyzing the drawing order;

determination means for determining whether the image to be output is a monochrome image, a color image having a number of colors larger than a predetermined value or a color image having a number of colors smaller than the predetermined value based on the number of colors counted by said count means; and image processing means for carrying out image processing and generating bit map image data, the bit map image data having the number of bits based on a result obtained by said determination means, wherein when said determination means determines that the image to be output is the monochrome image, said image processing means generates bit map image data of one bit.

2. An image processing apparatus according to claim 1, wherein the image processing for a monochrome image comprises processing of outputting binary data indicative of the monochrome image.

3. An image processing apparatus according to claim 1, wherein said determination means comprises indentification means for indentifying the number of colors of the image to be output by analyzing the drawing order.

4. An image processing apparatus according to claims 1, wherein said image processing means develops the image to be output on an off screen based on the drawing order.

5. An image processing apparatus according to claim 4, further comprising off screen creation means for creating the off screen based on the number of colors.

6. An image processing apparatus according to claim 4, wherein said identification means creates a table showing correspondence between colors contained in the image to be output and indices, and said image processing means develops the image to be output on the off screen according to the indices stored in the table when the number of colors is smaller than the predetermined value.

7. An image processing method comprising:

an input step of inputting drawing orders for forming an image to be output;

a count step of counting the number of colors included within a predetermined area in the image, by analyzing the drawing order;

a determination step of determining whether the image to be output is a monochrome image, a color image having a number of colors larger than a predetermined value or a color image having a number of colors smaller than the predetermined value based on the number of colors counted in said count step; and an image processing step of carrying out image processing and generating bit map image data, the bit map image data having the number of bits based on a result obtained in said determination step, wherein when said determination step determines that the image to be output is the monochrome image, said image processing step generates bit map image data of one bit.

8. A storage medium which stores a program for executing an image processing method comprising:

an input step of inputting drawing orders for forming an image to be output;

a count step of counting the number of colors included within a predetermined area in the image, by analyzing the drawing order;

a determination step of determining whether the image to be output is a monochrome image, a color image having a number of colors larger than a predetermined value or a color image having a number of colors smaller than the predetermined value based on the number of colors counted in said count step; and an image processing step of carrying out image processing and generating bit map image data, the bit map image data having the number of bits based on a result obtained in said determination step, wherein when said determination step determines that the image to be output is the monochrome image, said image processing step generates bit map image data of one bit.

9. An apparatus according to claim 1, further comprising formation means for forming an image based on the bit map image data generated by said image processing means.

* * * * *

UNITED STATES PATENT AND TRADEMARK OFFICE
CERTIFICATE OF CORRECTION

PATENT NO.    : 6,339,654 B1
DATED         : January 15, 2002
INVENTOR(S)   : Yamada It is certified that error appears in the above-identified patent and that said Letters Patent is hereby corrected as shown below:

<u>Column 3,</u>
Lines 45 and 67, "Embodiment" should read -- embodiment --.

<u>Column 4,</u>
Line 2, "Embodiment" should read -- embodiment --.
Line 32, "Embodiment." should read -- embodiment. --.

<u>Column 5,</u>
Line 4, "Embodiment," should read -- embodiment, --.
Line 57, "Embodi-" should read -- embodi- --.
Lines 58 and 66, "Embodiment," should read -- embodiment, --.

<u>Column 7,</u>
Line 18, "set" should read -- set as --.
Line 40, "include" should read -- includes --.
Lines 42 and 44, "set" should read -- set as --.
Line 60, "monochrome flags set" should read -- set monochrome flags --.
Line 62, "Embodiment," should read -- embodiment, --.

<u>Column 9,</u>
Lines 4, 27, 44 and 54, "Embodiment," should read -- embodiment, --.
Line 62, "being" should read -- is --.

<u>Column 10,</u>
Line 37, "area" should read -- areas --.
Line 45, "Embodiment," should read -- embodiment, --.
Line 63, "set" should read -- set as --.

<u>Column 11,</u>
Line 36, "Embodiment," should read -- embodiment, --.

UNITED STATES PATENT AND TRADEMARK OFFICE
CERTIFICATE OF CORRECTION

PATENT NO. : 6,339,654 B1
DATED : January 15, 2002
INVENTOR(S) : Yamada

It is certified that error appears in the above-identified patent and that said Letters Patent is hereby corrected as shown below:

<u>Column 12,</u>
Line 13, "are" should read -- and are --.
Lines 22 and 23, "Embodiment," should read -- embodiment, --.
Line 40, "Embodiments" should read -- embodiments --.

<u>Column 13,</u>
Line 32, "claims 1," should read -- claim 1, --.

Signed and Sealed this

Twenty-seventh Day of August, 2002

Attest:

Attesting Officer

JAMES E. ROGAN
*Director of the United States Patent and Trademark Office*